United States Patent
Du et al.

(10) Patent No.: US 11,702,585 B2
(45) Date of Patent: Jul. 18, 2023

(54) TIGHT OIL RESERVOIR $CO_2$ FLOODING MULTI-SCALE CHANNELING CONTROL SYSTEM AND PREPARATION METHOD

(71) Applicant: Southwest Petroleum University, Chengdu (CN)

(72) Inventors: Daijun Du, Chengdu (CN); Huancai Fan, Chengdu (CN); Wanfen Pu, Chengdu (CN); Rui Liu, Chengdu (CN); Fayang Jin, Chengdu (CN); Lin Sun, Chengdu (CN); Binyang Zou, Chengdu (CN); Bowen Chen, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/900,822

(22) Filed: Aug. 31, 2022

(65) Prior Publication Data

US 2023/0146672 A1 May 11, 2023

(30) Foreign Application Priority Data

Nov. 5, 2021 (CN) .......................... 202111304265.7

(51) Int. Cl.
*C09K 8/588* (2006.01)
*C09K 8/594* (2006.01)

(52) U.S. Cl.
CPC .............. *C09K 8/588* (2013.01); *C09K 8/594* (2013.01); *C09K 2208/10* (2013.01)

(58) Field of Classification Search
CPC ..... C09K 8/588; C09K 8/594; C09K 2208/10
See application file for complete search history.

(56) References Cited

FOREIGN PATENT DOCUMENTS

| CN | 107556996 A | | 1/2018 |
|----|-------------|---|--------|
| CN | 107686723 A | | 2/2018 |
| CN | 111548465 | * | 8/2020 |
| CN | 111548465 A | | 8/2020 |
| CN | 113462375 A | | 10/2021 |

OTHER PUBLICATIONS

Zhang (Smart mobility control agent for enhanced oil recovery during CO2 flooding in ultra-low permeability reservoirs, Fuel, 2019, 241, 442-450).*
Shen (CO2-responsive agent for restraining gas channeling during CO2 flooding in low permeability reservoirs, Fuel, 2021, 292, 120306).*

* cited by examiner

*Primary Examiner* — Kumar R Bhushan

(57) ABSTRACT

A tight oil reservoir $CO_2$ flooding multi-scale channeling control system and a preparation method, including nanoscale $CO_2$ responsive worm-like micellar systems and micron-scale $CO_2$ responsive dispersion gel, are provided. The nanoscale $CO_2$ responsive worm-like micelle system is prepared by $CO_2$ reactive monomers and organic anti-ion monomers stirred in water. The micron-scale $CO_2$ responsive dispersion gel is made of acrylamide, a responsive monomer, a silane coupling agent modified hydroxylated multi-walled carbon nanotubes as raw materials, cross-linked in water. The tight oil reservoir $CO_2$ multi-scale channel control system, has strong flow control ability during $CO_2$ displacement, and high-strength carbon nanotubes are introduced into the micro-scale $CO_2$ responsive dispersion gel, which effectively improves the strength and long-term stability of the dispersion gel, significantly enhances the sealing effect on cracks, and after displacement of the $CO_2$ of the system, the worm-like micelles revert to spherical micelles with good responsive reversibility.

4 Claims, 3 Drawing Sheets

TIGHT OIL RESERVOIR CO₂ FLOODING MULTI-SCALE CHANNELING CONTROL SYSTEM AND PREPARATION METHOD

FIELD OF THE INVENTION

The invention relates to the technical field of oilfield development, in particular to a tight oil reservoir $CO_2$ flooding multi-scale channeling control system and preparation method.

BACKGROUND OF THE INVENTION

The country is rich in tight oil resources, with geological resources of about 200×108 t. Under the background that the country has great crude oil consumption, and conventional crude oil resources are far from meeting the national demand, the efficient development of tight oil is very urgent. However, tight oil reservoirs have low permeability, poor pore-throat connectivity, and strong microscopic heterogeneity, resulting in almost no productivity before fracturing. Although the productivity is significantly improved after fracturing, but the water rises rapidly and the recovery efficiency is low (generally between 5% and 10%), therefore, it is necessary to improve the production of tight oil reservoirs through enhanced oil recovery technology.

Under the realistic background of intensified global climate change and the goal of "carbon peaking and carbon neutralization", $CO_2$ flooding is the important pathways for $CO_2$ sequestration and recycling, $CO_2$ flooding is also an important emission reduction technology for zero carbon and negative carbon. However, after volume fracturing of tight oil reservoirs, the artificial fracture network is complex, and the $CO_2$ injected into will be premature breakthrough along the fracture, resulting in low sweep efficiency and recovery efficiency. Therefore, how to realize equilibrium $CO_2$ flooding under cross-scale conditions of tight reservoir fracture and matrix permeability has become a research hotspot.

Foam and gel are commonly used in oilfields to control fractures to achieve cross-scale equilibrium $CO_2$ flooding in reservoirs, but they have fatal shortcomings in channeling control in tight oil reservoirs. The higher viscosity of the foam and the Jamin effect endow it with better plugging performance in heterogeneous reservoirs, but its strength and stability are not enough to control fractures; the base fluid of the gel system has fluid loss, chromatographic separation and macromolecular degradation, resulting in unstable gel strength and matrix damage. Therefore, it is urgent to develop low-damage matrix and selective channeling control system for fractured high-strength tight oil reservoirs with $CO_2$ injection.

Currently more and more $CO_2$ responsive materials have been developed that are inexpensive, plentiful and environmentally friendly. Current reported $CO_2$ responsive materials include responsive block polymers, microspheres, and worm-like micelles, which size will increase after in contact with $CO_2$, and the size will be recovered after other gases are used to replace $CO_2$, showing $CO_2$ switch function, providing the possibility for the construction of tight oil reservoirs $CO_2$ flooding selective channeling control system. At present, it has been reported that some scholars have used nano-scale $CO_2$ switch-type worm-like micelles for preventing $CO_2$ channeling in fractured low-permeability reservoirs, and the blocking ability of $CO_2$ switch-type worm-like micelles was clarified through artificial fracture displacement experiments, but the applicable temperature is low (<60° C.). Some scholars have also developed micron-scale $CO_2$ switch-type dispersion, and revealed the switching property through the change of particle size under $CO_2/N_2$ atmosphere, and its channeling potential was clarified by the fracture core displacement experiment, but $CO_2$ switch-type dispersion is used in large concentrations, so there is an urgent need to develop low-cost $CO_2$ switch-type temperature-resistant channeling control system to realize cross-scale $CO_2$ equilibrium displacement in tight oil reservoirs, and $CO_2$ resource utilization in the process of channeling control.

SUMMARY OF THE INVENTION

For existing shortcomings of the $CO_2$ responsive anti-channeling system, the present invention proposes a $CO_2$ flooding multi-scale channeling control systems, which have good deep migration ability, $CO_2$ responsiveness and high viscosity, suitable for $CO_2$ anti-channeling during displacement after fracturing in tight oil reservoirs.

The present invention discloses a tight oil reservoir $CO_2$ flooding multi-scale channeling control system, including nanoscale $CO_2$ responsive worm-like micelle system and micron-scale $CO_2$ responsive dispersion gel, wherein, in mass percent, the micron-scale $CO_2$ responsive dispersion gel are prepared by cross-linking the following components:
acrylamide 15%-25%;
responsive monomer 3%-8%;
silane coupling agent modified hydroxylated multi-walled carbon nanotubes 0.05%-0.1%;
initiator 0.01%-0.1% of total monomer mass;
cross-linking agent 0.5%-2% of the total monomer mass;
the other is water, and the total mass percent of the components is 100%;
the preparation method of the micron-scale $CO_2$ responsive dispersion gel, mainly includes:
after the silane coupling agent-modified hydroxylated multi-walled carbon nanotubes are dispersed uniformly in water by ultrasonic waves, under the condition of stirring speed of 300-500 r/min, acrylamide, responsive monomer, initiator and cross-linking agent are respectively added to the solution; inject $N_2$ into the solution until the solution becomes viscous, and use a thermometer to monitor the temperature change of the solution at this time, until the temperature of the solution rises to the highest temperature, the solution is in thermal insulation for 2-4 hours under the condition of the highest temperature of the solution to obtain a black gel; after granulation, drying and pulverization, obtain micron $CO_2$ responsive dispersion gel;

In one embodiment, in terms of concentration, the nanoscale $CO_2$ responsive worm-like micelle system is prepared by cross-linking the following components:
$CO_2$ responsive monomer 30-90 mmol/L;
organic counter ion monomer 30-90 mmol/L;
the solvent is water;
the preparation method of the nanoscale $CO_2$ responsive worm-like micelle system is:
$CO_2$ responsive monomer is completely dissolved in water to formulate $CO_2$ responsive monomer solution, under the condition of stirring speed of 300-500 r/min, add organic counter ion monomer with the same amount of the $CO_2$ responsive monomer to the $CO_2$ responsive monomer solution, and stir at room temperature until it is uniform to obtain nano-scale $CO_2$ responsive worm-like micelle system.

Furthermore, the $CO_2$ responsive monomer is one of N,N-dimethylcyclohexylamine; N,N-dimethylbenzylamine; N,N-dimethylbutylamine; tetramethylethylenediamine;

trimethylamine; N,N-Dimethyloleic acid amidopropyl tertiary amine; diethylenetriamine; cocoyl dimethyl tertiary amine; erucic acid amidopropyl dimethyl tertiary amine; or a combination thereof.

Furthermore, the organic counter ion monomer is one or a combination of sodium p-styrenesulfonate, sodium dodecylbenzenesulfonate, sodium p-toluenesulfonate and sodium oleate.

In another embodiment, the silane coupling agent used for the modification of the hydroxylated multi-walled carbon nanotubes is one or a combination of γ-methacryloyloxypropyltrimethoxysilane, vinyl tri(β-methoxyethoxy) silane, and vinyl triethoxy silane.

In one embodiment, the responsive monomer is one of N-methyl-N-vinylformamide, N,N-diethylaminoethyl methacrylate and dimethylaminoethyl methacrylate, or a combination thereof.

In one embodiment, the initiator is composed of ammonium persulfate, ammonium hydrogen sulfite and azobisisobutyramidine hydrochloride in a weight ratio of 1:1:2.

In one embodiment, the cross-linking agent is selected from one of N,N-methylenebisacrylamide, phenolic cross-linking agent and polyethyleneimine, or a combination thereof.

Another object of present invention is to provide a preparation method of the tight oil reservoir $CO_2$ flooding multi-scale channeling control system, mainly includes the following steps: micron-scale $CO_2$ responsive dispersion gel is added to nano-scale $CO_2$ responsive worm-like micelles to form an initial mixing system to allow the concentration range of the micron-scale $CO_2$ responsive dispersion gel in the initial mixing system is 0.3%-0.5%, and then the initial mixing system is stirred to allow the micron-scale $CO_2$ responsive dispersion gel in nano-scale $CO_2$ responsive worm-like micelle system uniform suspension to obtain the tight oil reservoirs $CO_2$ multi-scale channeling control system.

Compared with the prior art, the beneficial effects of the present invention are:

1. After nano-scale $CO_2$ responsive worm-like micelle system contacts $CO_2$, the spherical micelles were transformed into worm-like micelles, the solution viscosity increased significantly, and the flood control capability is enhanced during $CO_2$ displacement;

2. High-strength carbon nanotubes is introduced into the micron $CO_2$ responsive dispersion gel, improves the strength and long-term stability of the dispersion gel. After the dispersion gel contacts $CO_2$, the hydrophilicity is enhanced, the size of the dispersion gel becomes larger, and the plugging effect on cracks is enhanced;

3. Nanoscale $CO_2$ responsive worm-like micelles coupled with micron-scale $CO_2$ responsive dispersion gel system, forms a whole through supramolecular interactions after contact $CO_2$, thus enhancing the plugging strength of the system during the $CO_2$ displacement process; After displacement the $CO_2$ in the system, the size of the dispersion gel becomes smaller, and the worm-like micelles recovers to spherical micelles, showing good response reversibility.

BRIEF DESCRIPTION OF THE DRAWINGS

In order to more clearly illustrate the technical solution of the present invention, the drawings described in the embodiment will be briefly described below, and it should be understood that the following drawings are only shown in some embodiments of the present invention, so it should be seen as a defined scope, and will be obtained in accordance with these figures, without paying creative labor, in terms of ordinary skill in the art.

DETAILED DESCRIPTION OF PREFERRED EMBODIMENTS

Figure 1:
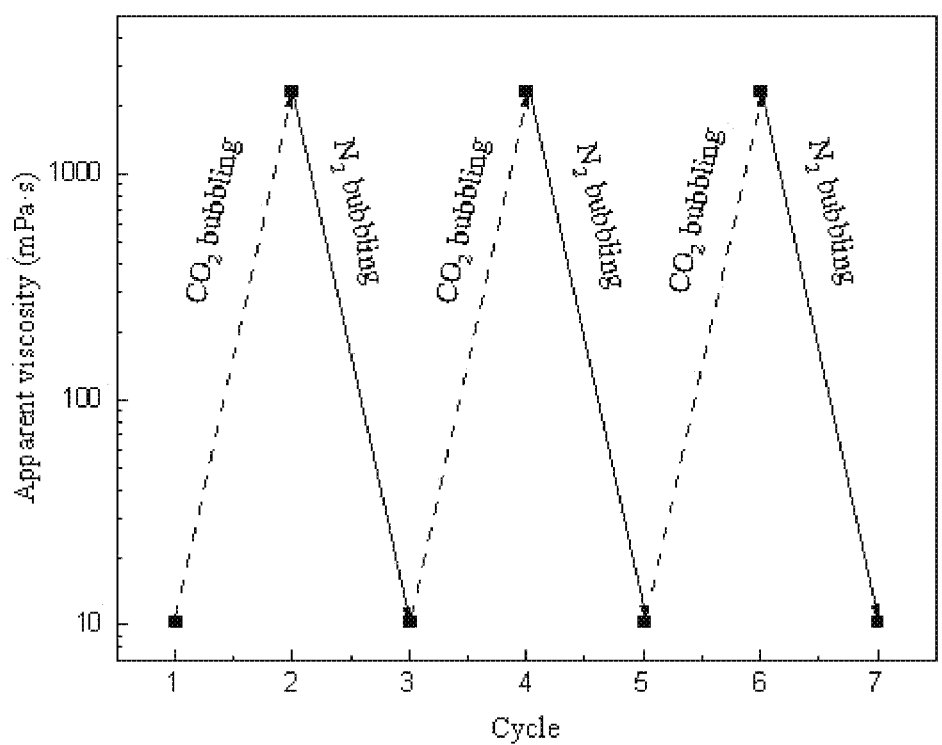
FIG. 1 shows $CO_2$ responsive performance evaluation result graph of the tight oil reservoirs $CO_2$ responsive multi-scale channeling control system.

The present invention will be further described in detail below with reference to the embodiments and the accompanying drawings, but the embodiments of the present invention are not limited thereto.

Example 1

1) Preparation of Nanoscale $CO_2$ Responsive Worm-Like Micellar Systems

Dissolve N,N-dimethyl oleoaminde-propylamine in deionized water, prepare 200 mL of N,N-dimethyloleic acid amidopropyl tertiary amine solution with a concentration of 90 mmol/L. Add 18 mmol sodium p-styrene sulfonate to the above solution under the condition of stirring at a stirring speed of 300 r/min, and stop stirring after the solution is uniform to obtain nano-scale $CO_2$ responsive worm-like micelle system.

2) Micron $CO_2$ Preparation of Responsive Dispersion Gel 0.1 g of γ-methacryloyloxypropyl trimethoxysilane modified hydroxylated multi-walled carbon nanotubes were uniformly dispersed in 75 mL of deionized water under ultrasonic conditions, and then under the condition of stirring at a stirring speed of 300 r/min, 20 g of acrylamide, 5 g N,N-diethylaminoethyl methacrylate, 0.5 mL ammonium persulfate (concentration 1 wt %), 0.5 mL sodium bisulfite (concentration 1 wt %) and 1 mL azobisisobutyramidine hydrochloride (concentration 1 wt %) %) and 1 mL of phenolic cross-linking agent were added to the solution. The solution is then introduced with $N_2$ until the solution becomes viscous and use a thermometer to monitor the temperature of the solution. When the temperature of the solution rises to the highest point and starts to cool down, keep the temperature for 2 hours to obtain a black monomer gel; the monomer gel is granulated, dried, pulverized to get micron $CO_2$ responsive dispersion gel.

It is worth noting that the method for modifying carbon nanotubes by using a silane coupling agent to prepare the above-mentioned silane-modified carbon nanotubes is a prior art in the art, and will not be repeated here.

3) Preparation of $CO_2$ Responsive Multiscale Channeling Control Systems.

0.8 g micron-scale $CO_2$ responsive dispersion gel obtained above was added to the aforementioned 200 mL of 90 mmol/L nano-scale $CO_2$ responsive worm-like micelle system, fully stirred until the dispersion gel is uniformly suspended and dispersed in the micelle system, that is, the tight oil reservoir $CO_2$ responsive multi-scale channeling control system.

Example 2

1) Preparation of Nanoscale $CO_2$ Responsive Worm-Like Micellar Systems

Dissolve N,N-dimethyl oleoaminde-propylamine in deionized water, prepare 200 mL of N,N-dimethyloleic acid amidopropyl tertiary amine solution with a concentration of 70 mmol/L, and under a condition of stirring at a stirring speed of 500 r/min, add 14 mmol sodium oleate is added to the above solution, and stop stirring after the solution is uniform to obtain nano-scale $CO_2$ responsive worm-like micelle system.

2) Preparation of Micron $CO_2$ Responsive Dispersion Gel 0.07 g of γ-methacryloyloxypropyl trimethoxysilane modified hydroxylated multi-walled carbon nanotubes are uniformly dispersed in 70 mL of deionized water under ultrasonic conditions, and then under a condition of stirring at a stirring speed of 500 r/min, 20 g of acrylamide, 8 g N,N-diethylaminoethyl methacrylate, 0.6 mL ammonium persulfate (concentration 1 wt %), 0.6 mL sodium bisulfite (concentration 1 wt %) and 1.2 mL azobisisobutyramidine hydrochloride (concentration 1 wt %) and 0.2 g N,N-methylenebisacrylamide are added to the solution. The solution is then introduced with $N_2$ until the solution becomes viscous and use a thermometer to monitor the temperature of the solution. When the temperature of the solution rises to the highest point and starts to cool down, keep the temperature for 2 hours to obtain a black monomer gel; the monomer gel is granulated, dried, pulverized to get micron $CO_2$ responsive dispersion gel.

3) Preparation of $CO_2$ Responsive Multiscale Channeling Control System 1.0 g micron-scale $CO_2$ responsive dispersion gel obtained above is added to the aforementioned 200 mL of 70 mmol/L nanoscale $CO_2$ responsive worm-like micelle system, fully stirred until the dispersion gel is uniformly suspended and dispersed in the micelle system, that is, obtaining the tight oil reservoir $CO_2$ responsive multi-scale channeling control system.

1. $CO_2$ Responsive Evaluation of the Tight Oil Reservoirs $CO_2$ Responsive Multi-Scale Channeling Control System Under stirring condition at a rate of 100 mL/min, $CO_2$ is injected into the tight oil reservoir $CO_2$ responsive multi-scale channeling control system prepared in Example 1. After 60 min, the viscosity of the system at 30° C. was measured by Brookfield DV-III viscometer (shear rate $7.34s^{-1}$); then inject $N_2$ into the system under the same conditions, repeat the above steps three times, observe the $CO_2$ of the system responsiveness and reversibility, the experimental results are as follows FIG. 1 shown.

It can be seen that after the system contacts $CO_2$, the viscosity increased from 10.4 mPa·s to 2339 mPa·s. When the $CO_2$ in the system is replaced by $N_2$, the viscosity of the system was reduced to 10.4 mPa·s. After 3 cycles, the highest viscosity of the system remained at 2339 mPa·s, and the lowest viscosity remained at 10 mPa·s, showing good $CO_2$ responsiveness and reversibility.

Figure 2:
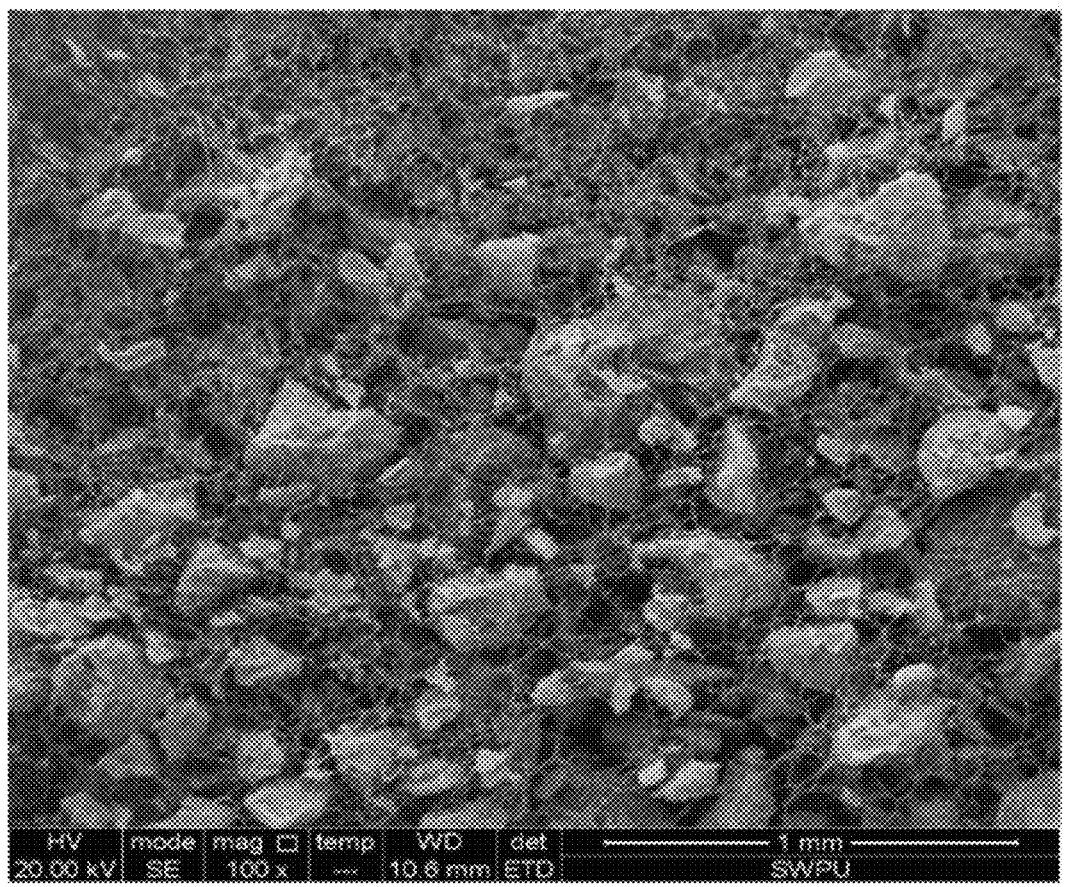
FIG. 2 shows a microscopic topography of the tight oil reservoirs $CO_2$ responsive multi-scale channeling control system.

2. Micromorphology of Tight Oil Reservoirs $CO_2$ Responsive Multiscale Channeling Control System Under stirring conditions at a rate of 100 mL/min, $CO_2$ is injected into the tight oil reservoir $CO_2$ responsive multi-scale channeling control system prepared in Example 2, after 60 min, stop the introduction of $CO_2$, the micro-morphology of the system was observed by environmental scanning electron microscope, and the results are as FIG. 2 shown. The three-dimensional network structure can be clearly observed in the system, which is the basic structure of worm-like micelles. In addition, supramolecular aggregates formed by worm-like micelles and particle side chains can be observed on the surface of the disperse gel. The dispersion gel and worm-like micelles are formed as a whole through supramolecular aggregates, which can effectively increase the anti-channeling properties of the system, ensuring that the channeling control effect of the entire channeling control system.

3. Evaluation of Anti-Channeling Performance

Figure 3:
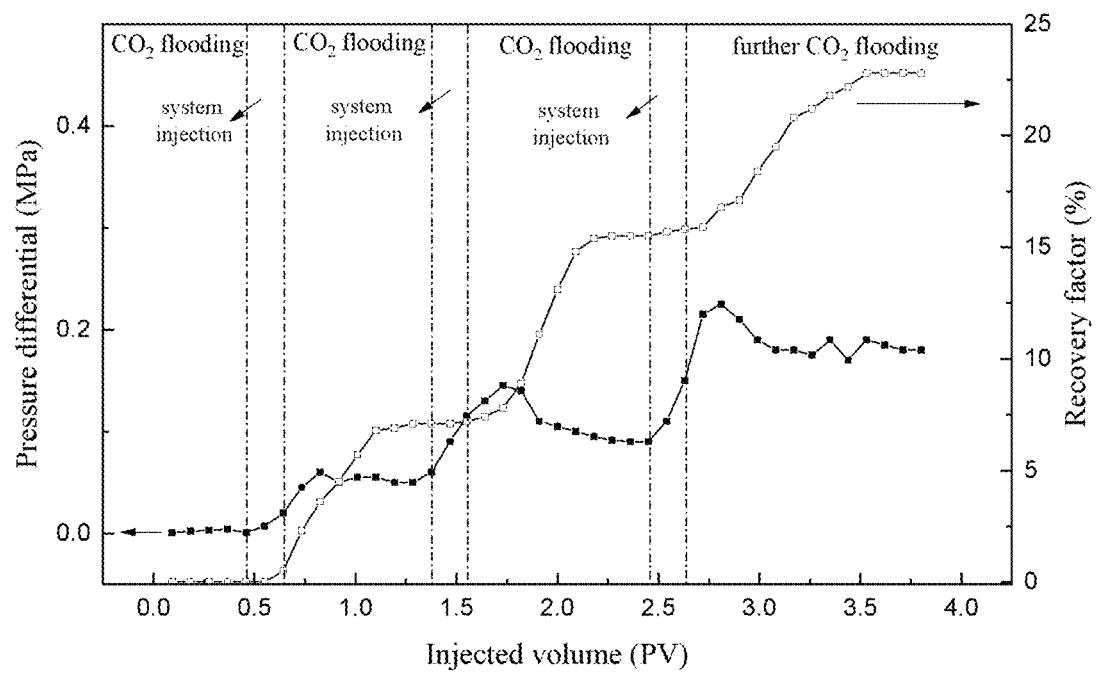
FIG. 3 shows a test chart of anti-channeling performance of the tight oil reservoirs $CO_2$ responsive multi-scale channeling control system during $CO_2$ displacement.

To verify the effect of the present invention proposed $CO_2$ responsive multi-scale channeling control system in tight oil reservoir $CO_2$ flooding, the development of $CO_2$ oil displacement experiment, using the $CO_2$ responsive multi-scale channeling control system prepared in Example 2. Fractured rock slabs were used to carry out the displacement experiments. The rock slab parameters are 10 cm in length and width, 1 cm in height, and 0.2 mm in crack width. With "$CO_2$ flooding-injection system-$CO_2$ flooding-injection system-$CO_2$ flooding-injection system-$CO_2$ flooding" step, keeping the injection volume of each system at 0.25 PV, the final measurement results are as follows FIG. 3 shown. See FIG. 3, It can be seen that when $CO_2$ is first injected, the injected $CO_2$ channeling occurs along the fracture, and no crude oil is recovery at this time; when the system is injected in an alternate way, the system and $CO_2$ full contact, the viscosity of the system increases, a higher pressure gradient is established, and the injected $CO_2$ turning to enter the matrix, expanding the swept volume, when the pressure difference reaches about 0.2 MPa, the final recovery factor is increased by about 23%, and it has good channeling control potential.

The above description is only a preferred embodiment of the present invention, but the protection scope of the present invention is not limited to this. Changes or substitutions should be included within the protection scope of the present invention. Therefore, the protection scope of the present invention should be subject to the protection scope of the claims.

What is claimed is:

1. A tight oil reservoir $CO_2$ flooding multi-scale channeling control system, comprising nanoscale $CO_2$ responsive worm-like micelle system and micron-scale $CO_2$ responsive dispersion gel;
    wherein, in mass percent, the micron-scale $CO_2$ responsive dispersion gel are prepared by cross-linking the following components:
  acrylamide 15%-25%;
    responsive monomer 3%-8%;
    silane coupling agent modified hydroxylated multi-walled carbon nanotubes 0.05%-0.1%;
    initiator 0.01%-0.1% of total monomer mass;
    cross-linking agent 0.5%-2% of the total monomer mass; and
    water, wherein the total mass percent of the components is 100%;
    the preparation method of the micron-scale $CO_2$ responsive dispersion gel is:
    after the silane coupling agent modified hydroxylated multi-walled carbon nanotubes are dispersed uniformly in water by ultrasonic waves, under the condition of stirring speed of 300-500 r/min, the acrylamide, responsive monomer, initiator and cross-linking agent are respectively added to the solution; $N_2$ is injected into the solution until the solution becomes viscous, and a thermometer is used to monitor the temperature change of the solution, until the temperature of the solution rises to a highest temperature when cooling down starts, the solution is kept in thermal insulation for 2-4 hours under the condition of the highest temperature of the solution to obtain a black gel; micron-scale $CO_2$ responsive dispersion gel is obtained after granulation, drying and pulverization of the black gel;

wherein, the responsive monomer is N-methyl-N-vinylformamide, N,N-diethylaminoethyl methacrylate, dimethylaminoethyl methacrylate, or a combination thereof;

wherein, the nanoscale $CO_2$ responsive worm-like micelle system is prepared by cross-linking the following components:

$CO_2$ responsive monomer 30-90 mmol/L;

organic counter ion monomer 30-90 mmol/L; and a solvent comprising water;

the preparation method of the nanoscale $CO_2$ responsive worm-like micelle system is:

$CO_2$ responsive monomer is completely dissolved in water to formulate $CO_2$ responsive monomer solution, under the condition of stirring speed of 300-500 r/min, the organic counter ion monomer is added with the same amount of the $CO_2$ responsive monomer to the $CO_2$ responsive monomer solution, and the solution is stirred at room temperature to obtain uniform nano-scale $CO_2$ responsive worm-like micelle system;

wherein the $CO_2$ responsive monomer is N,N-dimethylcyclohexylamine, N,N-dimethylbenzylamine, N,N-dimethylbutylamine, tetramethylethylenediamine, trimethylamine, N,N-dimethyloleoamindepropylamine, diethylenetriamine, cocoyl dimethyl tertiary amine, erucic acid amidopropyl dimethyl tertiary amine, or a combination thereof the organic counter ion monomer is sodium p-styrenesulfonate, sodium dodecylbenzenesulfonate, sodium p-toluenesulfonate, sodium oleate, or a combination thereof.

2. The tight oil reservoir $CO_2$ flooding multi-scale channeling control system as claimed in claim 1, wherein the silane coupling agent modified hydroxylated multi-walled carbon nanotubes is γ-methacryloyloxypropyltrimethoxy silane, vinyl tri(β-methoxyethoxy) silane, vinyl triethoxy silane, or a combination thereof.

3. The tight oil reservoir $CO_2$ flooding multi-scale channeling control system as claimed in claim 1, wherein the initiator is composed of ammonium persulfate, ammonium hydrogen sulfite and azobisisobutyramidine hydrochloride in a weight ratio of 1:1:2.

4. The tight oil reservoir $CO_2$ flooding multi-scale channeling control system as claimed in claim 1, wherein the cross-linking agent is N,N-methylenebisacrylamide, phenolic crosslinking agent, polyethyleneimine, or a combination thereof.

* * * * *